G. F. ETZEL.
SPARROW TRAP.
APPLICATION FILED JUNE 3, 1914.
1,145,982.
Patented July 13, 1915.
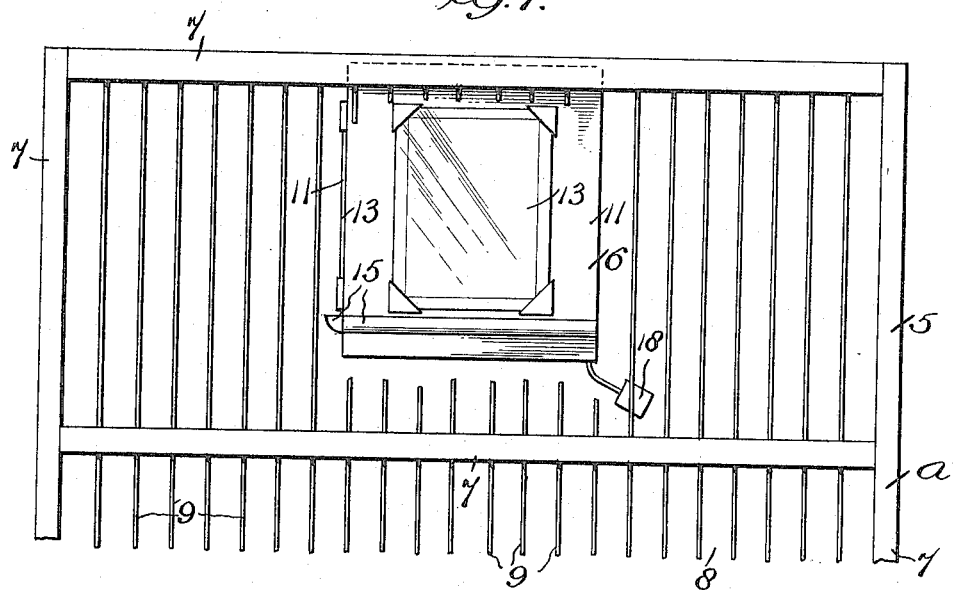
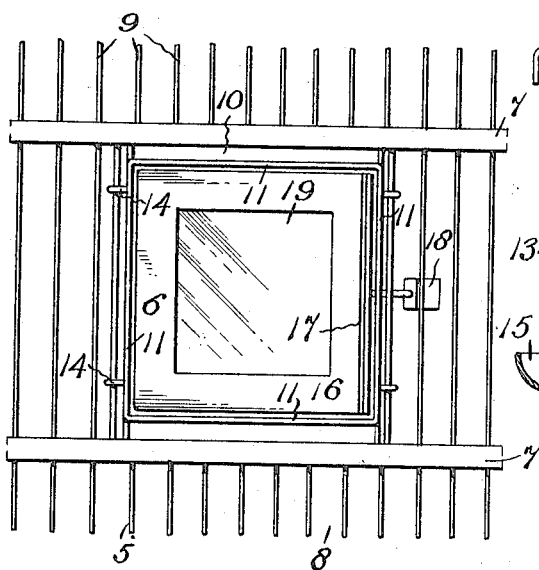
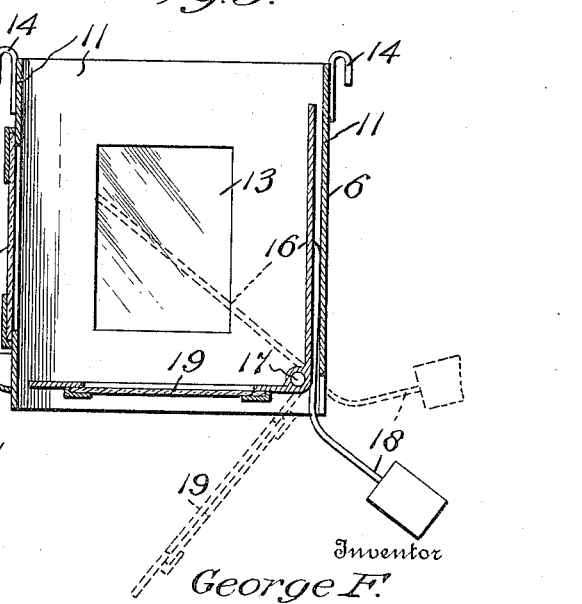
Witnesses
C. James Cronin
M. E. Laughlin
Inventor
George F. Etzel,
By Victor J. Evans
Attorney

UNITED STATES PATENT OFFICE.

GEORGE F. ETZEL, OF BROOKLYN, NEW YORK.

SPARROW-TRAP.

1,145,982. Specification of Letters Patent. Patented July 13, 1915.

Application filed June 3, 1914. Serial No. 842,705.

*To all whom it may concern:*

Be it known that I, GEORGE F. ETZEL, a citizen of the United States, residing at Brooklyn, in the county of Kings and State of New York, have invented new and useful Improvements in Sparrow-Traps, of which the following is a specification.

The general object of this invention is to refine the construction of traps for birds, animals and the like in point of providing a trap which may be automatically reset to an operative position after an animal or bird has been captured thereby.

Another object of the invention is to provide a trap wherein bait may be exposed to sight but which will be inaccessible to the animal or bird at all times, thereby necessitating only the original baiting of the trap. And to these ends the invention consists of a wire receptacle having an opening in the top wall thereof, and a casing detachably secured to the receptacle and arranged within the opening and an angular shaped trap door pivotally mounted in the casing and arranged to close the bottom thereof, the trap door being counterweighted and provided for precipitating the animals into the receptacle.

Other objects will appear and be better understood from that embodiment of my invention of which the following is a specification, reference being had to the accompanying drawings forming part hereof, in which:—

Figure 1 is an elevational view of a portion of my improved trap. Fig. 2 is a top plan view of a portion of the trap, and Fig. 3 is a vertical sectional view of the inner casing.

As shown in the drawings the trap $a$ is formed of the receptacle 5, and the casing 6 which is suspendedly arranged in the receptacle 5.

The receptacle 5 may be made of any size desired, and is formed of a frame-work 7 which may be of suitable wood or metal and which is provided with suitable openwork sides 8. These sides 8 may be of wire mesh screening or the like, but for the purpose of illustrating the present embodiment of the invention, the same is shown in the form of upright rods 9, which are arranged in convenient spaced relation with each other in order to retain the captured animals or birds within the closure.

As will be noted in Fig. 2, an opening 10 is provided in the upper side of the receptacle 5, wherein is suspendedly arranged the casing 6. This casing 6 is of smaller size in relation to the receptacle 5, and is provided with side walls 11 while the upper and lower portions are open. These sides are provided with a suitable transparent window 13 such as glass or the like, and hooks 14 are provided at the upper portion of the casing so as to suspend the same as shown. For the purpose of attracting animals or birds into the trap, suitable troughs 15 are provided at the exterior portions of the casing, so as to provide suitable bait receptacles, thus it will be seen, that the animal will not be able to reach the bait which is placed within these troughs. A suitable trap door 16 is provided within the casing and is arranged to close the bottom thereof. This door is angular in shape and is pivotally arranged within the casing 6, as indicated at 17, and for the purpose of normally retaining the door in the position shown in Fig. 3, a suitable weighted arm 18 is secured to the door, and operates to return the same to the position shown, when the door is tilted. So as to allow the captured birds or animals to be seen from above and thereby act as a lure, the horizontal portion of the door 16, is provided with a transparency 19; thus a bird seeing a bird in the trap will endeavor to enter also, whereupon by alighting upon the door the latter will be tilted as shown in dotted lines, and by virtue of the angular shape of the door the bird will be unable to escape, but will be forced to enter the lower portion of the trap, after which the door will resume its normal position as stated.

It is obvious that those skilled in the art may vary the details of construction and arrangements of parts without departing from the spirit of my invention and therefore I do not wish to be limited to such features except as may be required by the claim.

What I claim as new is;—

A trap comprising a receptacle having an opening in its top, a casing detachably secured in the receptacle and arranged within the opening thereof, said casing having transparent side walls, and an angular shaped counterweighted trap door pivotally mounted in the casing and arranged to close the bottom thereof, that part of the door which normally closes the casing having a transparency.

In testimony whereof I affix my signature in presence of two witnesses.

GEORGE F. ETZEL.

Witnesses:
 JOHN A. DONEGAN,
 GEO. A. BYRNE.

Copies of this patent may be obtained for five cents each, by addressing the "Commissioner of Patents, Washington, D. C."